US008111896B2

(12) United States Patent  (10) Patent No.: US 8,111,896 B2
Agliozzo et al.  (45) Date of Patent: Feb. 7, 2012

(54) METHOD AND SYSTEM FOR AUTOMATIC RECOGNITION OF PRENEOPLASTIC ANOMALIES IN ANATOMIC STRUCTURES BASED ON AN IMPROVED REGION-GROWING SEGMENTATION, AND COMMPUTER PROGRAM THEREFOR

(75) Inventors: Silvano Agliozzo, Turin (IT); Alberto Bert, Pinasca (IT); Ivan Dmitriev, Turin (IT)

(73) Assignee: IM3D S.p.A., Turin (IT)

( * ) Notice: Subject to any disclaimer, the term of this patent is extended or adjusted under 35 U.S.C. 154(b) by 703 days.

(21) Appl. No.: 12/300,724

(22) PCT Filed: May 15, 2006

(86) PCT No.: PCT/IT2006/000358
§ 371 (c)(1),
(2), (4) Date: Nov. 13, 2008

(87) PCT Pub. No.: WO2007/132487
PCT Pub. Date: Nov. 22, 2007

(65) Prior Publication Data
US 2009/0175527 A1    Jul. 9, 2009

(51) Int. Cl.
*G06K 9/00* (2006.01)
(52) U.S. Cl. ...................................... 382/132
(58) Field of Classification Search ............... 378/4, 19, 378/50, 51, 54; 382/128, 130–132
See application file for complete search history.

(56) References Cited

U.S. PATENT DOCUMENTS

| 5,920,319 | A | 7/1999 | Vining et al. | |
| 6,556,696 | B1 * | 4/2003 | Summers et al. | 382/128 |
| 2003/0223627 | A1 | 12/2003 | Yoshida et al. | |
| 2005/0031202 | A1 * | 2/2005 | Accomazzi et al. | 382/173 |

(Continued)

OTHER PUBLICATIONS

Mie Sato, et al., "A Gradient Magnitude Based Region Growing Algorithm For Accurate Segmentation" Image Processing, 2000. Proceedings. 2000 International Conference on Sep. 10-13, 2000, IEEE, Sep. 2000, pp. 448-451, vol. 3, XP010529500.

(Continued)

*Primary Examiner* — Irakli Kiknadze
(74) *Attorney, Agent, or Firm* — Sughrue Mion, PLLC

(57) ABSTRACT

A process for the automatic recognition of anomalies in anatomical structures, as well as a processing system and a computer program for implementing the process are described, the process comprising the steps of:

Figure 1:
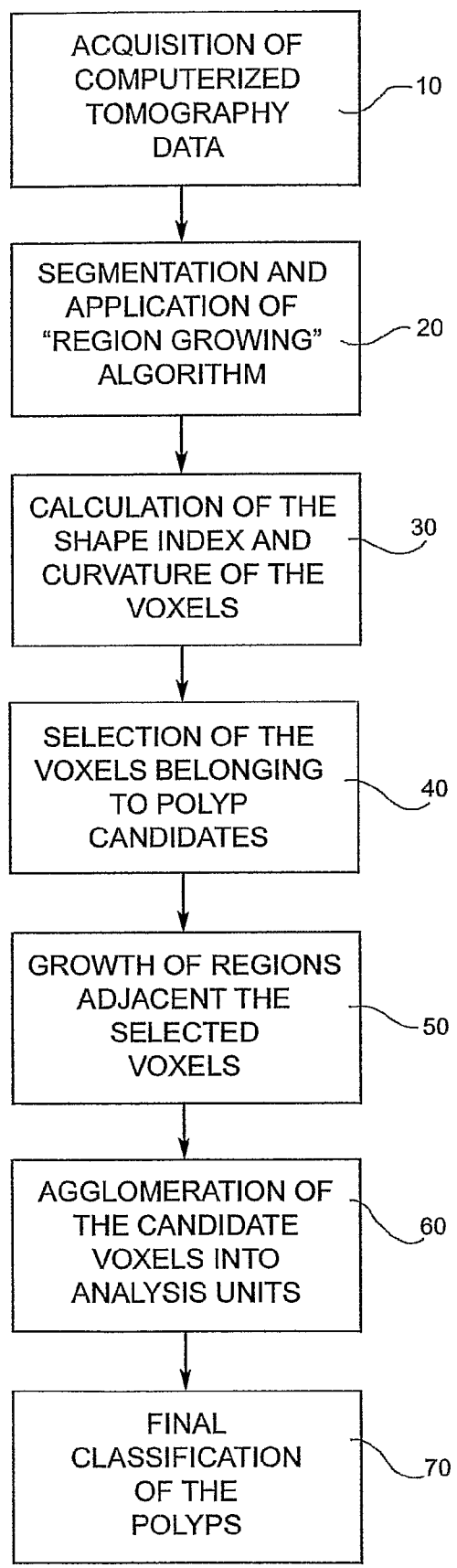

acquisition (10) of a plurality of two-dimensional images of at least a portion of a patient's body, which are suitable for forming a three-dimensional representation of at least one anatomical structure under observation, segmentation (20) of a region of interest of the three-dimensional representation, potentially bearing the anomalies, selection (30, 40) of the volume image elements (voxels) of the segmented region that are candidates for belonging to anomalies of the anatomical structure represented, on the basis of predetermined morphological parameters, and classification (70) of the voxels as elements suspected of belonging to anomalies or elements not belonging to anomalies, in which the segmentation (20) takes place by progressive growth of the region of interest by aggregation of voxels in accordance with a predetermined criterion of similarity, starting with seed voxels situated within the region of interest, the region growth step comprising a first volume growth stage in which the growth is carried out on the basis of a predetermined global criterion of similarity between voxels in each direction of growth, and a second fine growth stage for the definition of a boundary of the region of interest, in which the growth is carried out on the basis of local similarity criteria for each respective direction of growth.

11 Claims, 5 Drawing Sheets

U.S. PATENT DOCUMENTS

2005/0113679 A1* 5/2005 Suryanarayanan et al. .. 600/425
2005/0117787 A1* 6/2005 Iordanescu et al. ........... 382/128

OTHER PUBLICATIONS

Yoshitaka Masutani, et al., "Computerized Detection of Pulmonary Embolism in Spiral CT Angiography Based on Volumetric Image Analysis", IEEE Transactions on Medical Imaging, Dec. 2002, pp. 1517-1523, vol. 21, No. 12, XP011076401.

Steven W. Zucker, "Region Growing: Childhood and Adolescence", Computer Graphics and Image Processing, Sep. 1976, pp. 382-399, vol. 5, No. 3, XP001149042.

* cited by examiner

METHOD AND SYSTEM FOR AUTOMATIC RECOGNITION OF PRENEOPLASTIC ANOMALIES IN ANATOMIC STRUCTURES BASED ON AN IMPROVED REGION-GROWING SEGMENTATION, AND COMMPUTER PROGRAM THEREFOR

The present invention relates to the processing of images and, specifically, to the recognition of objects and/or structures in the images and in particular of formations that are representative of anomalies in anatomical structures.

More specifically, it relates to a method for the automatic recognition of anomalies in anatomical structures and in particular of preneoplastic lesions of the colon/rectum, in accordance with the preamble to Claim 1, as well as to a processing system and a computer program for implementing said process.

Processes, systems and computer programs for identifying three-dimensional lesions in organs and tissues of the human body by the analysis of digital representations of an anatomical structure and subsequent classification of the anomalies detected are known.

Today, colorectal carcinoma represents the second largest cause of neoplastic mortality worldwide. Diagnostic procedures have recently been established which are less invasive than traditional medical colonoscopy examinations and which enable the entire colon to be explored without the need to introduce probes which may trouble the patient or even damage the tissues (perforation, haemorrhage), leading to severe complications.

These diagnostic procedures utilize radiodiagnostic techniques to perform a so-called "virtual endoscopy". According to this technique, it is possible to achieve a display of the patient's organs similar to that of traditional endoscopic procedures by the three-dimensional processing of a series of images obtained by Computerized Tomography (CT).

Systems which perform a virtual colonoscopy (VC) are currently in use. However, this type of virtual navigation inside the colon cavity involves very lengthy examinations of the patients because of the time required to process the images and for the doctor to read them, since it is necessary to scan the entire length of the colon (about 1.5 metres).

The image of the colon is recognized and extracted from the set of image data produced by computerized tomography by utilizing the differences in the intensity of X-ray absorption by the air contained in the colon cavity and by the tissue of the colon itself.

In particular, an operation of segmentation of the internal surface of the colon is performed. Segmentation is an operation dedicated to the extraction of parts of image constituting homogeneous regions on the basis of a predetermined criterion of belonging of the image elements to a region; the image of the internal surface of the colon is thus extracted from the overall three-dimensional image obtained by tomography by the recognition and elimination of the air spaces outside the patient, the air spaces inside the lungs, the fat and muscle regions and, finally, the air space inside the colon, in accordance with the differences in X-ray absorption intensity between the above-mentioned regions.

Once the internal surface of the colon has been extracted, a quantitative characterization thereof is performed by calculating some morphological properties of the volume elements (technically known as voxels), that are recognized as belonging thereto. These properties are utilized to distinguish healthy tissue from potentially diseased tissue and from faecal residues.

A method for the three-dimensional analysis of lesions of organs which operates as stated above is described, for example in American patent application US 2003/0223627 A1.

The solutions proposed up to now for the automatic identification of neoplastic lesions of the colon (polyps) have the great disadvantage that the interpretation of the images may be complex when there are numerous alterations in the surface which may be attributable to polyps but also to artefacts (faeces, artefacts of movement, etc.), giving rise to an unacceptable error percentage (false positives and false negatives).

The segmentation operation that is performed in accordance with known techniques does not enable the internal surface of the colon to be reconstructed effectively and does not therefore enable actual polyps to be distinguished from other surface alterations. For this reason the doctor has to dedicate a large amount of time to analysis of the data relating to a single patient, rendering the procedure unsuitable for large-scale analysis (precautionary screening).

The object of the invention is to provide a methodology for the automatic recognition of formations that are representative of anomalies in anatomical structures and in particular of preneoplastic lesions in the colon/rectum, which overcomes the limitations of the prior art.

This and other objects are achieved according to the invention by means of a method the principle characteristics of which are defined in Claim 1.

A processing apparatus and a computer program for implementing the above process form further subjects of the invention, as claimed.

In summary, the invention is based on the performing of an operation of segmentation of the regions of interest of an image relating to an anatomical structure potentially bearing anomalous formations, in accordance with a "region growing" technique.

The "region growing" technique involves the growth of homogeneous spatial regions in accordance with a predetermined criterion of similarity as regards to adjacent regions. The similarity criterion depends on the characteristic of interest of the image elements, that is, on the (significant) property selected for distinguishing between different regions of the image for the desired purposes.

In the specific case, the property considered is the intensity of absorption of the X-radiation used in the tomography technique for the acquisition and representation of images of a patient's internal organs but it may, similarly, be the response of objects to other diagnostic radiation or, more generally, the response of objects that are present in the field of investigation due to interaction between the objects and an excitation electromagnetic radiation incident thereon, for example, the colour of the objects (characterized by wavelength and intensity) determined by the reflection of incident luminous radiation thereby.

The growth algorithm according to the invention is performed in two stages, that is, a first volume growth stage, preferably in accordance with a 6-connected topology, that is, along the three perpendicular spatial axes and in both directions, and a second stage of growth up to the boundary for the accurate determination of the boundary of the region of interest.

The first stage is stopped, in each direction of growth, when a predefined global growth threshold is reached, and enables first image elements (voxels) constituting the rough boundary of the segmented region to be defined.

The second stage comprises a further, local growth which starts from each of the first boundary voxels reached, is performed in the direction of growth from which they were reached, and finishes when an adaptive local stopping threshold is reached; this threshold is calculated on the basis of the intensity values of the voxels belonging to a predetermined area surrounding the boundary voxel from which the local growth started; on completion of this local growth, the actual boundary voxels (which may or may not coincide with the first rough boundary voxels) of the region of interest are identified.

Advantageously, in the currently envisaged use of virtual colonoscopy, the segmentation step is performed by the segmentation of the colon cavity region and can reconstruct the internal surface of the organ with greater accuracy, thus enabling any polyps that are present to be distinguished better from other geometrical surface variations which have different morphological characteristics and different origins.

Figure 2A:
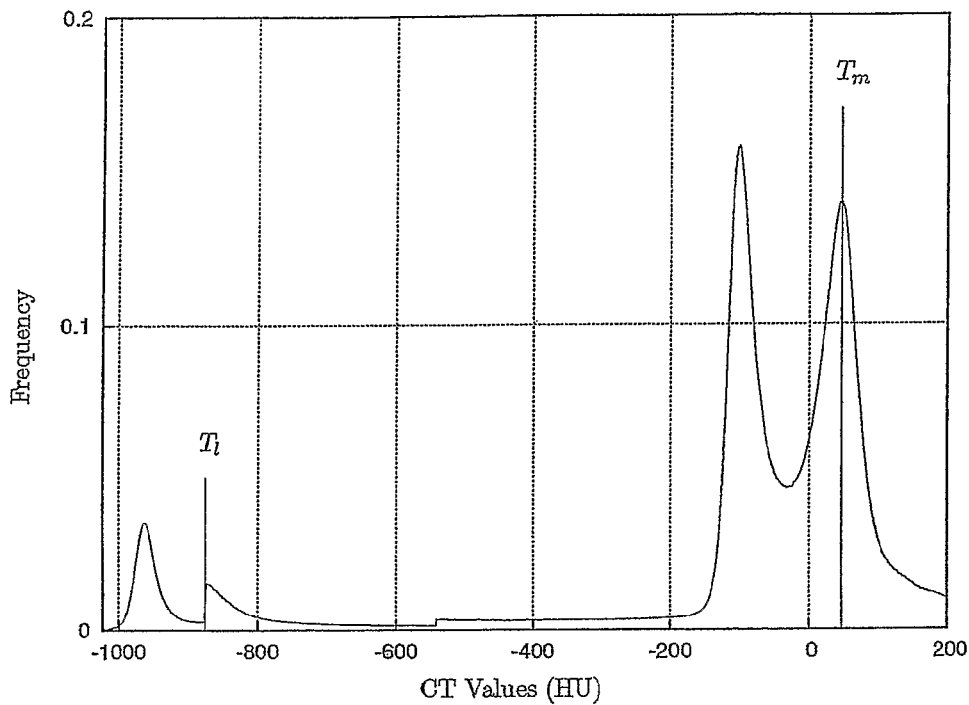
Figure 2B:
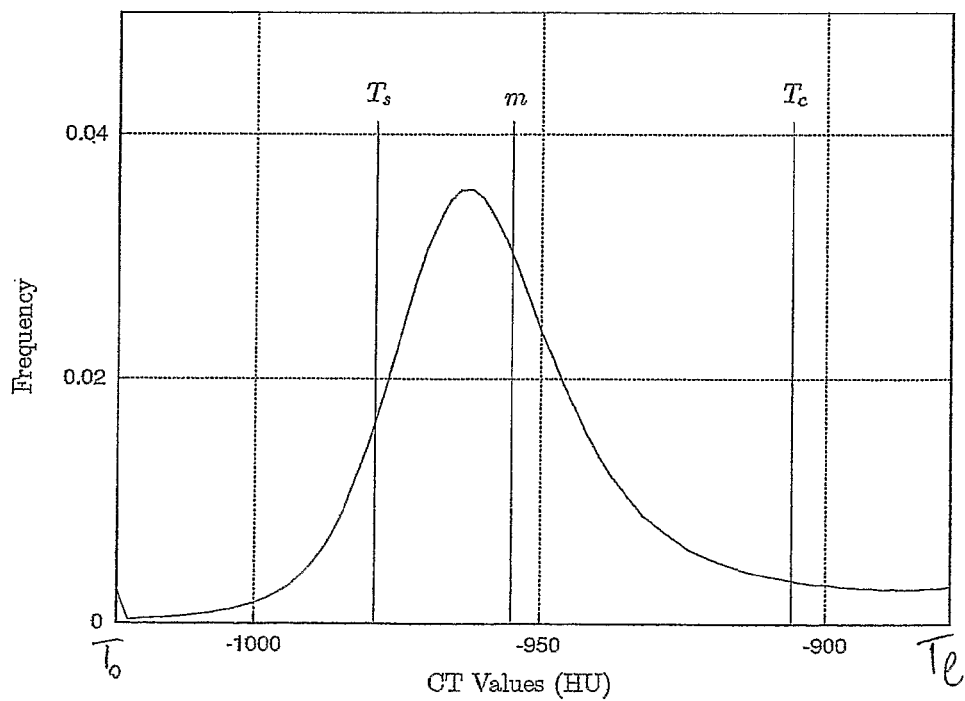
Figure 3:
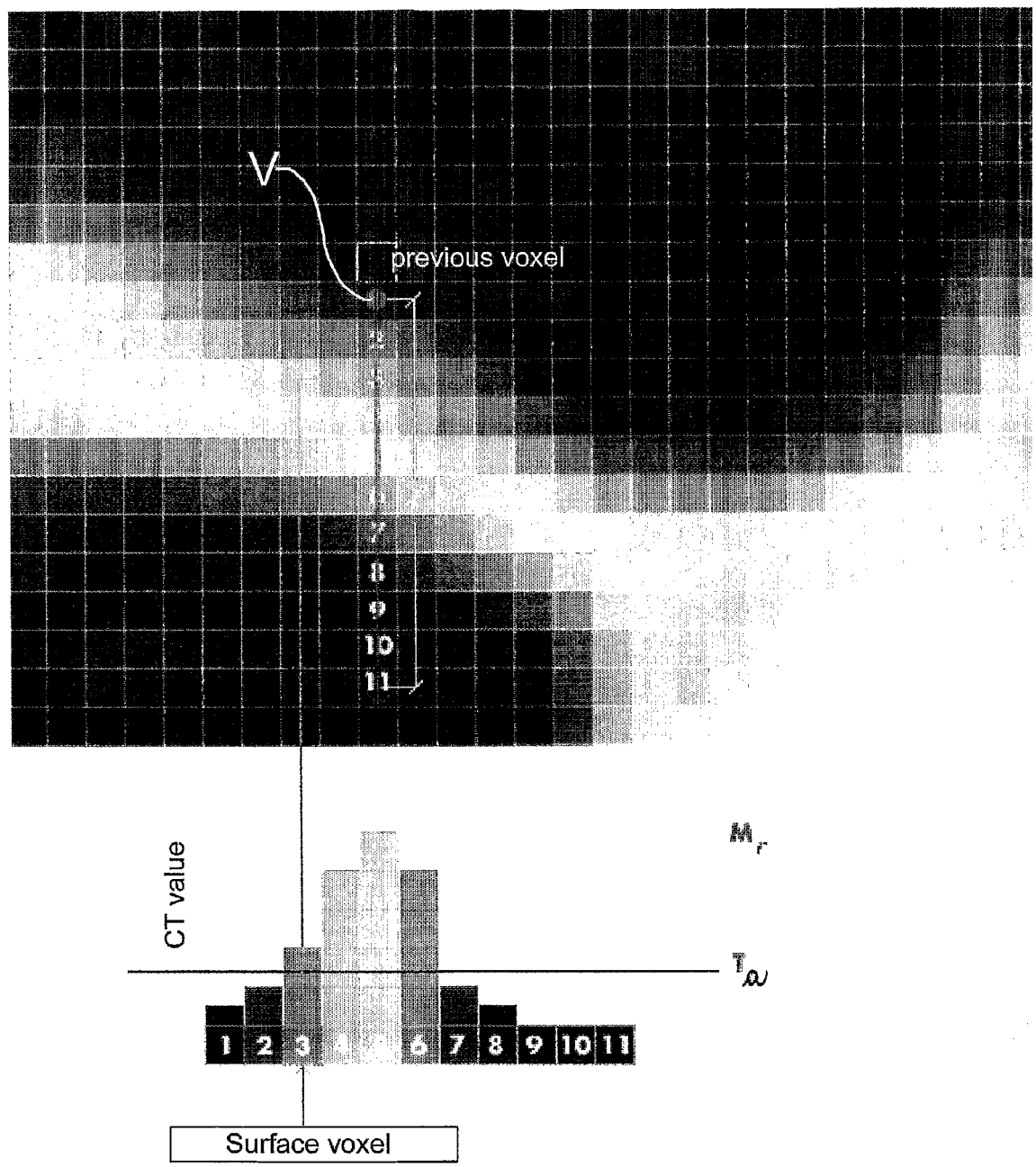
Figure 4:
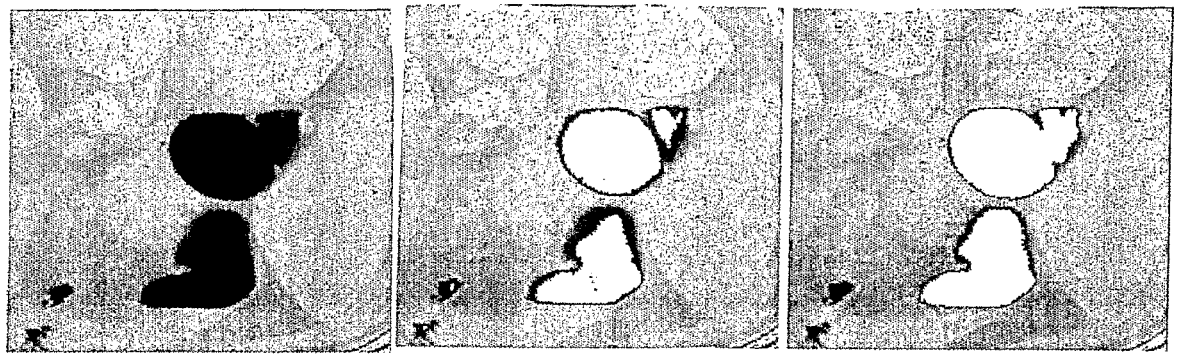
Figure 5:
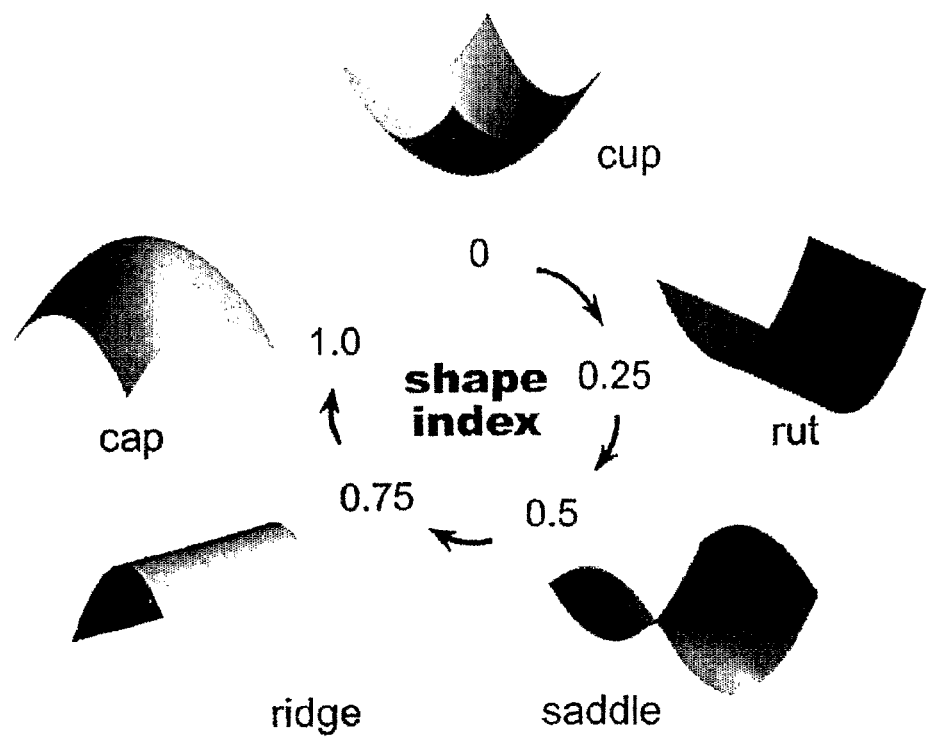
Figure 6:
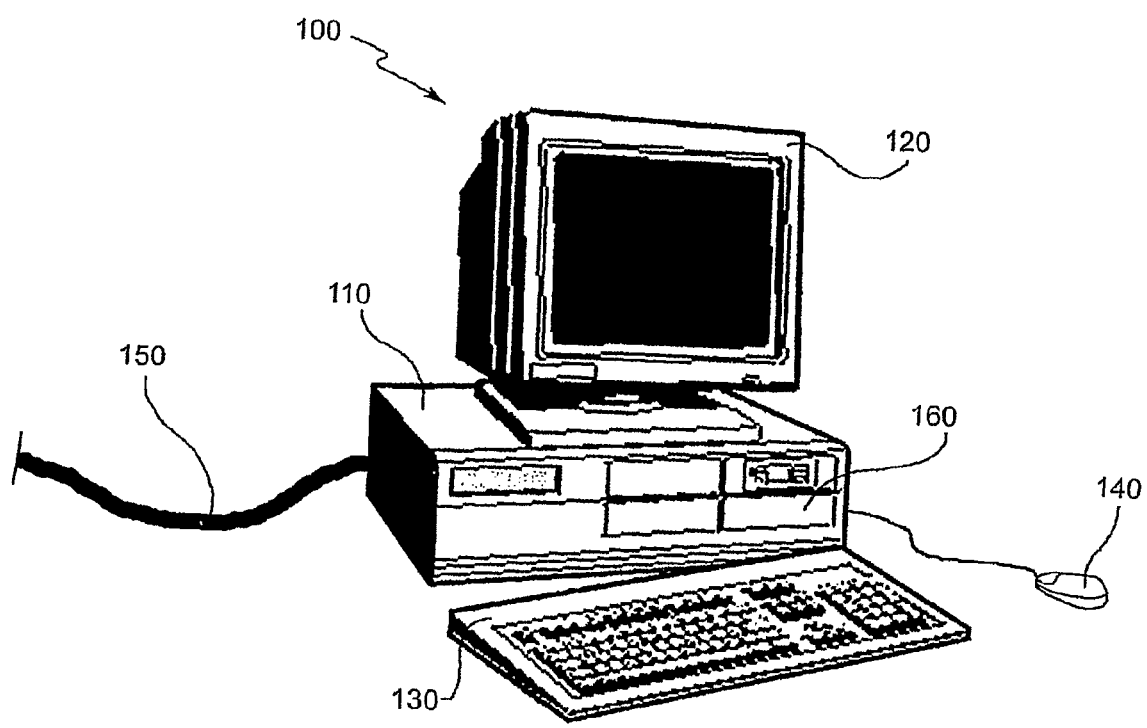

Further characteristics and advantages of the invention will become clear from the following detailed description which is given purely by way of non-limiting example with reference to the appended drawings, in which:

FIG. 1 is a flow chart of the process of the invention,

FIGS. 2a and 2b are histograms of the distribution of absorption intensities of the image elements in a residual image obtained by a first segmentation of regions outside the colon, FIG. 3 is a representation, on an enlarged scale, of the voxels belonging to a limited area surrounding the surface of the colon and of the local scanning path followed in a fine growth stage, FIG. 4 shows three grey-scale images representing a portion of the internal surface of the colon before, in the course of, and after the colon cavity segmentation step, respectively, FIG. 5 is a representation of five different types of surface characterized by corresponding shape index used for the recognition of anomalies in anatomical structures, and FIG. 6 is a diagram of a processing system for recognizing preneoplastic lesions of the colon/rectum, according to the invention.

FIG. 1 shows the various steps of a process for the recognition of anomalous formations in anatomical structures according to the invention and, in the embodiment described by way of example, of the recognition of lesions (polyps) in the colon/rectum.

The process starts with the acquisition of Computerized Tomography images in step 10 and then, in step 20, on the basis of the images acquired, the internal surface of the colon is segmented by means of a refined "region growing" algorithm which will be described in detail below.

In the next step 30, predetermined geometrical parameters of the recognized voxels belonging to the internal surface of the colon are calculated and voxels which are candidates for belonging to polyp regions are selected (step 40).

Preferably, in step 50, a subsequent process of growth of regions adjacent the selected voxels is performed and the regions grown in the area surrounding the candidate voxels are further agglomerated into analysis units (step 60). Finally, a final classification of the analysis units as polyps or non-significant artefacts is performed (step 70).

The various steps which are shown in the flow chart of FIG. 1 and which are listed briefly above will now be described in detail.

Once the Computerized Tomography data has been acquired in the standard medical format DICOM, it is first of all converted into a format suitable for being processed by an image representation and display program.

The next step of automatic segmentation of the colon surface, on the basis of the converted image data, constitutes the core of the present invention.

The first step that is necessary for the analysis of the colon image is the extraction of the colon region from the three-dimensional image of the patient's abdomen obtained by tomography. In fact, the Computerized Tomography apparatus supplies an overall image of the patient's abdomen in which, as well as the colon, other organs or anatomical structures such as the lungs (only a portion), the liver, the kidneys, or the pelvic bones are also present. From this overall image, it is necessary to extract (to segment) solely the information which is of interest, that is, the colon region and in particular, its surface.

The accuracy of the segmentation is an important condition for achieving significant results in the subsequent calculation steps.

For the segmentation of the colon, a technique of three-dimensional growth of the colon cavity region is used; this enables image elements (voxels) to be grouped together on the basis of predetermined criteria of proximity and similarity (homogeneity).

The proximity criterion is expressed by the selection of the voxels close to a given voxel. In the specific implementation, the six voxels that are disposed along the three spatial directions of a Cartesian reference system (and in both directions) are considered as close.

Similarity (homogeneity) is fulfilled by the application of a predetermined function which quantifies the similarity between regions. In the specific case, the function is based on the X-ray absorption intensity value of the individual voxels (hereinafter referred to more briefly as voxel intensity) and in particular on the belonging of this value to a predetermined range defined by a pair of adaptive thresholds, that is, a lower threshold and an upper threshold, respectively.

The segmentation procedure is implemented in three stages: segmentation of the external space that does not form part of the patient's abdomen, which enables the image area relating to the exterior of the patient's body to be eliminated; segmentation of the lungs which enables the image area corresponding to the region occupied by the air contained in the lungs to be eliminated; segmentation of the colon which enables the internal surface of the colon to be extracted, on the basis of the colon cavity.

These three segmentation stages share a similar approach comprising the steps of:

1) generation of the histogram of the intensities of the voxels (residual) making up the image;

2) identification, in the histogram, of the characteristic peaks corresponding to the distributions of the intensity values of the image elements relating to the anatomical substances and structures present in the area represented;

3) determination of the minimum and maximum intensity thresholds (for colon segmentation an intermediate threshold is also determined) that are suitable for defining the similarity criterion for the segmentation of the (residual) image;

4) selection of one or more seed voxels as characteristic starting elements from which to perform a growth constrained by the thresholds defined in step 3.

The histogram is re-analyzed for each segmentation stage (external air, lungs, colon) so that voxels of air belonging to other structures are progressively eliminated and this increases the accuracy that can be achieved in the remaining parts.

The three stages differ in the step of growth from the seed voxels as follows:

Segmentation of the external air. Starting from the sides of the image, each horizontal line of each two-dimensional image is scanned (from the right-hand end towards the left-hand end and vice versa) up to the first voxel the intensity of which is not within the range.

All of the voxels found are classified as belonging to the region of air outside the patient and eliminated (in the specific case, replaced by a predetermined intensity value outside the range).

A growth of the regions is also performed in the area surrounding the voxels selected, to which the role of seed voxels is attributed, to identify small "hidden areas" which—owing to their morphology (for example, concave areas seated inside a solid structure)—could pass unnoticed in the scanning by horizontal lines.

Segmentation of the lung. The voxels belonging to the first two-dimensional image of the series of images obtained by the tomography (the image facing towards the patient's head) which have intensity values within the predetermined range the thresholds of which (second thresholds) have been recalculated with respect to the previous step are used as seeds. Starting with these seeds, a three-dimensional region growth is performed in accordance with a 6-connected topology.

In order to distinguish, amongst the structures identified, those which belong to the lungs, the specific surface of the segmented structure is determined; the specific surface is defined as the ratio between the number of surface voxels and the number of space voxels included by the surface voxels. As is well known, lung segments have a high specific surface. Only the segments having a specific surface above a respective predetermined threshold value and a volume below a respective predetermined threshold value are classified as lung regions.

The voxels recognized as belonging to the lung regions are eliminated (in the specific case, replaced by a predetermined intensity value outside the range).

These two segmentation steps are similar to those described in the literature, for example, in US 2003/0223627.

The sole remaining structure containing air is now the colon cavity (and, only in rare cases, the stomach).

Segmentation of the colon. All of the voxels which still have an intensity between a respective third pair of recalculated thresholds (initialization thresholds) within the image are used as seeds. A three-dimensional growth is then performed in accordance with a 6-connected topology based on a fourth pair of thresholds (growth thresholds).

Starting with the boundary voxels which were identified upon completion of the growth and which were reached in the various directions of growth and which have intensities which do not fall within the range between the fourth predetermined thresholds, a local threshold is calculated for each boundary voxel. The voxels which are distributed in the area surrounding the boundary voxels in a local direction of growth (scanning) coinciding with the previous direction of growth followed, and which are still within the local threshold, are aggregated with those obtained by the previous growth step and again attributed to the colon cavity region. The first voxels with intensities above the respective local threshold that are encountered in the local directions of growth are considered to be "intestinal surface" and are aggregated into "segments" on the basis of adjacency.

As in the previous lung segmentation stage, the specific surface of each segment is analyzed to distinguish the "colon/rectum" from the small intestine and from any other structures (stomach, residual lung portions).

Prior to the segmentation procedure, it is also possible to perform a preliminary step which consists of the closure of the "lateral holes" which may form when the starting image data does not include the whole colon, owing to an error, so that the colon cavity is not entirely surrounded by the colon tissue but is "open" laterally, that is, the colon surface which surrounds the cavity does not describe a closed curve. This may occur in Computerized Tomography images which do not include a complete section of the patient's body but only a portion thereof.

In this case, the voxels belonging to the cylindrical surface of the entire three-dimensional representation are identified, that is, the voxels corresponding to the outermost image elements of each tomography image (owing to its circular area) and, from this surface, the regions contiguous with air are identified by performing a region growth limited to the cylindrical surface (adjacency is considered in the 26 directions) starting with the air voxels not yet attributed to any region. Amongst the regions identified, those which have a longitudinal extent, that is, an extent along the patient's axis (the Z axis) above a predetermined threshold are discarded while the residual regions are interpreted as potential holes in the colon and an intensity value higher than that of air is assigned to the voxels belonging thereto. This method is justified by the fact that external air spaces contiguous with the cylindrical surface of the three-dimensional representation probably extend along the patient's entire longitudinal axis or along most of it, whereas air spaces forming part of the colon cavity have a limited extent in the longitudinal direction by virtue of the tortuous bending of the colon.

The colon segmentation process which takes place on a Computerized Tomography image from which the external air regions and most of the lung air regions have previously been removed will now be described in further detail. In this connection, reference is made to FIGS. 2a and 2b.

In order to perform the segmentation, it is necessary to extract the histogram of the X-ray absorption intensity values of the entire residual image to be analyzed. The regions of the histogram having intensity values between $T_0$ and $T_l$, where $T_0$ corresponds to the lowest possible intensity value (−1000 HU) and $T_l$ is the intensity value which corresponds to a single peak of air attributable to the lung region, correspond to the distribution of the intensity values of the image elements which represent substantially the air contained in the colon cavity.

Reference will be made to this region of the histogram or distribution to calculate the values of thresholds used in the colon segmentation process.

A first intermediate initialization threshold intensity value $T_s$, defined as equal to the difference between the mean and the standard deviation of the distribution between $T_0$ and $T_l$, is determined. The voxels of the residual image (after the elimination of the external air and the lung air) are analyzed and those having intensity values between $T_0$ and $T_s$ are selected as seeds for the subsequent "growth" process.

The lower and upper thresholds of the "growth" process (in the six spatial directions) are $T_0$ and $T_c$, respectively, where $T_c$ (the upper growth threshold) is defined as equal to the sum of the mean and twice the standard deviation of the distribution between $T_0$ and $T_l$.

When a boundary voxel, that is, a voxel having an intensity value greater than the maximum intensity $T_c$, is reached during the "growth" process, a fine growth process based on a local (upper) threshold $T_a$ calculated on the basis of the local intensity values of the voxels in the area surrounding the colon walls is implemented.

With reference to FIG. 3, a scanning path or radius 1 of predetermined length preferably equal to 7 mm, is traced from a boundary voxel V in the direction from which it was reached and the voxels which lie thereon are analyzed. The maximum intensity value of the voxels reached along the radius is indicated $M_r$. If $M_r$ is below a comparison threshold $T_w$, which is established as equal to the sum of the mean and four times the standard deviation of the distribution between $T_0$ and $T_f$, it is assumed that the radius traced does not intersect the colon wall and the values reached are aggregated with the previous ones and recognized as belonging to the colon cavity. If $M_r$ is greater than $T_w$, the value of the local upper threshold $T_a$ is calculated by increasing the value of the upper growth threshold $T_e$ by a predetermined fraction q of the difference between $M_r$ and the upper growth threshold $T_c$ (for example in accordance with the equation: $T_a = T_c + q(M_r - T_c)$, in which the fraction q is preferably 0.1. The first voxel having an intensity value above the new local threshold $T_a$ is identified as a voxel belonging to the colon surface.

If the scanning radius is too long and there are dense structures, for example, bone in the vicinity of the colon walls, the maximum intensity value of the voxels reached along the radius ($M_r$) could be too high, thus compromising the correct identification of the colon surface. To prevent this behaviour, a limit intensity value $T_m$ of the image voxels corresponding to the value of a muscle zone, that is, equal to the value corresponding to the peak of the histogram in the band of X-radiation absorption values included between 0 and 200 HU, is defined as the upper limit of $M_r$.

Together with the segmentation of the colon, a few segments of other abdominal anatomical structures and also of lungs may be extracted in this step. As stated above, these can also be recognized and dealt with appropriately on the basis of their specific surfaces so that only the segments having specific surfaces below a respective predetermined threshold value and a volume above a respective predetermined threshold value are classified as belonging to the colon.

FIG. 4 shows the images of an internal colon surface portion prior to segmentation, after segmentation with global thresholds, and after fine segmentation with local thresholds, respectively.

When the voxels of the internal colon surface have been found by the segmentation step, some of their properties are determined; amongst these, the main properties are their geometrical characteristics, X-ray absorption intensity histograms, and statistical texture analysis by means of parameters such as, for example, contrast, correlation, energy, entropy, and local homogeneity.

As far as the geometrical characteristics are concerned, the shape index (SI) and the curvature (CV) are preferably calculated. These parameters enable any polyps that are present inside the colon to be distinguished from geometrical structures of different curvature and shape.

Shape index and curvature are expressed as functions of the local curvatures $k_{max}$ and $k_{min}$ of a structure in perpendicular planes by means of the following equations:

$$SI(p) = \frac{1}{2} - \frac{1}{\pi}\arctan\frac{k_{max}(p) + k_{min}(p)}{k_{max}(p) - k_{min}(p)}$$

$$CV(p) = \frac{2}{\pi}\ln\sqrt{\frac{k_{max}(p)^2 + k_{min}(p)^2}{2}}$$

where p is the position of the voxel.

The shape index classifies the volumetric topological shape of the voxel in the position p into five classes, generally known as: "cup", "rut", "saddle", "ridge", and "cap" (see FIG. 5). Larger shape index values correspond to a shape of the "cap" type and are particularly interesting because many polyps exhibit this shape.

The curvature parameter characterizes the magnitude of the actual curvature in the voxel and thus provides a local estimate of the extent to which the surface is curved in the voxel.

The parameters SI and CV require the calculation of the principal curvatures $k_{max}$ and $k_{min}$ which in turn require the calculation of the first and second partial differential derivatives of the colon surface on the three perpendicular reference axes x, y and z. For the calculation of the partial differential coefficients, the recursive application of Deriche filters, as is known from the literature, is preferred. The equations of the partial differential derivatives are used to calculate the SI and CV parameters for each voxel forming part of the surface. The voxels that are characterized by SI and CV values between a minimum and a maximum are selected as candidates for belonging to regions suspected of containing polyps and are then used as initial points from which to extract candidate polyp regions.

Calculation of the shape index and curvature parameters has been found to be significantly costly in computational terms and in terms of memory resources. This is due to the fact that the calculation is performed on the whole surface or large surface portions containing hundreds of thousands of voxels. To reduce the amount of memory necessary for the calculations, it is advantageous to divide the colon surface into "bounding boxes" or adjacent analysis volumes. Given a starting axial section, the dimensions of the analysis volumes are increased one step at a time along the development direction of the colon (the z axis) and in both directions. The increase in the volumes is interrupted when a predetermined z dimension is reached or when the colon surface is completed. The dimensions along the x and y axes vary according to the section of the colon cavity involved, whereas the z dimension is configured prior to their calculation and advantageously corresponds to a number of two-dimensional images of between 20 and 30 axial sections.

A second parameter dedicated to the over-dimensioning of the analysis volumes, the values of which can be modified in the x, y and z directions, is advantageously also configured. In the z direction, this parameter gives rise to an overlapping of analysis volumes and this is performed to reduce the effects of distortion of the curvature calculation at the edges of the analysis volumes.

The selection of the voxels by means of the shape-index (SI) and curvature (CV) morphological parameters is followed by a growth, in terms of number of voxels, of the regions adjacent the selected voxels by hysteresis techniques, by an agglomeration of the selected voxels grown and by a further growth of voxels within the tissue adjacent the selected surface regions.

The Hysteresis method enables a set of voxels that are spatially connected to the previously selected initial regions to be extracted. This method leads to the extraction of a larger number of internal colon surface voxels which potentially correspond to a larger portion of a polyp. The additional voxels are selected by reducing the lower threshold of the shape index parameter (SI) and increasing the range of interest of the curvature parameter (CV).

Once the voxels have been characterized on the basis of their physical/geometrical properties, they are advantageously agglomerated into individual analysis units which represent the regions that are candidates for being classified as belonging or not belonging to polyps.

The voxels are grouped into analysis units on the basis of the spatial density distribution of the selected voxels. The principle on which this agglomeration step is based consists of the recognition of the regions of greater density of selected voxels so that, inside each agglomeration, the voxel density is greater than outside, and the density inside noise zones is always less than inside the agglomerations. This step requires the definition of two parameters: the minimum number of points which the area surrounding a voxel should possess and the radius of the surrounding area. The values of the parameters are selected empirically from a series of Computerized Tomography images. This procedure is not discussed in further depth herein since it is not relevant for the purposes of the invention.

This agglomeration step is performed, for example, by the known DBSCAN algorithm described in the article "Density Based Algorithm for Discovering Clusters in Large Spatial Database with Noise" by Ester, Kriegel, Sander and Xu, published in Proceedings of 2nd International Conference on Knowledge Discovery and Data Mining (1996). The algorithm enables any number of agglomerations of any shape to be recognized, irrespective of noise, from the voxels selected.

The analysis units thus obtained are extended from the colon surface to the adjacent tissue.

This extension is achieved by joining the surface voxels identified by the agglomeration by means of rectilinear segments. The voxels through which these segments extend and which belong to the tissue adjacent the surface are added as new voxels of the agglomerations. This procedure advantageously enables even the smallest agglomerations to be extended sufficiently to have a significant number of constituent voxels.

The agglomerations obtained represent the candidate polyps for subsequent analysis of the colon/rectum.

The number of voxels belonging to the analysis units selected is normally much smaller than the whole of the internal surface of the colon/rectum.

However, even analysis units that do not belong to polyps may be selected by this process. These selections contribute to an increase in the number of false positives, that is, of candidate polyps that are selected as suspects but do not actually belong to polyps.

To reduce their number, it is advantageous to calculate further parameters descriptive of other properties of the voxels which might improve the discriminating capacity of the recognition algorithm.

As well as the geometrical properties of the voxels, it is preferable also to study other properties, for example, properties connected with the X-ray absorption intensities of the individual voxels. In this connection, the intensity histograms for each voxel of the colon surface and of an area surrounding it are studied. The purpose of this analysis is to check whether the voxels of regions belonging to polyps have a histogram which is characteristic and different from those of voxels of other colon regions. In fact, in many cases, polyps show a difference in X-ray absorption in comparison with healthy tissue or faecal residues.

Neural networks, for example a conventional "feed-forward" neural network, may be used to study the characteristics of the histograms.

Another property that is studied is the texture, which is a property connected with image intensity. It can easily be perceived by the human eye and is believed to be a rich source of information on the nature and shape of three-dimensional objects. Texture is a complex visual form composed of macro-structural or micro-structural sub-shapes which have a characteristic brilliance, colour or size. The local properties of the sub-shapes enable characteristics of luminosity, uniformity, density, granularity, regularity, noise, and directionality of a texture as a whole to be distinguished.

There are various approaches to texture analysis, that is: structural, statistical, model, or transform approaches.

Amongst these approaches, second-order statistical approaches have shown better results than other analysis approaches. For this reason and owing to the characteristics of images of the abdomen which do not have macro-structural sub-forms, it is advantageous to apply a statistical approach, for example, an approach based on the co-occurrence matrices which are known in the literature.

The calculation is computationally intensive and, for this reason, is advantageously performed solely in the thirteen directions which define the first, second and third neighbours of a voxel and their respective distances.

In addition to the intensity and texture histogram, other characteristic parameters may be used for the reduction of false positives. One of these is calculation of the Zernike moments; another is based on sectioning of the polyp.

With the first method, use is made of the fact that the polyps can be recognized not only by analyzing the information content of the Computerized Tomography image data relating to the absorption and to its 3D spatial distribution, but also by means of their spheroidal morphology. In this connection, the Zernike coefficients that are known in the literature are calculated. These geometric descriptors have been used for the recognition of images of objects in large databases of images. These parameters enable an object of a given shape to be recognized, irrespective of its size and orientation. These particular properties of symmetry render Zernike coefficients particularly advantageous for the investigation of the morphology of polyps the shape of which is generally spheroidal but the size of which may vary from a few millimetres up to more than a centimetre and which may have any orientation in space.

With the second method, on the other hand, use is made of the fact that the polyps have an almost circular cross-section in a plane parallel to their bases. The method therefore consists of the identification of the geometrical plane which most closely approximates to the edge voxels of the surface of the candidate polyp and of its division into "slices" parallel to that plane. At this point, the voxels of each "slice" are classified on the basis of a calculation of the standard deviation of the distance between each voxel of the "slice" and a hypothetical "centre" of the "slice" to determine the circularity.

All of the parameters characterizing the voxels represent a large quantity of information to be analyzed in order to classify the voxels, distinguishing between voxels of regions suspected of belonging to polyps and voxels of healthy tissue regions.

The classification of voxels addresses a problem of multi-dimensional recognition which can be solved by neural networks and/or other statistical classifiers.

The process according to the invention is performed by a system of the type illustrated in FIG. 6 which comprises a computerized workstation 100 of known type, having a processing subsystem 110, a display device 120, a keyboard 130, a pointing device (mouse) 140, and a device for connection to a local network (a network bus) 150. Alternatively, the processing system may be of the distributed type (not shown) having a processing subsystem and local or remote peripheral input/output devices. The workstation 100 or the distributed system are arranged for processing groups or modules of processing and calculation programs which are stored on a disk 160 or are accessible on a network and which are suitable for displaying the process described and for displaying the results on the display 120. The solutions described are considered well known in the art and will not be described further herein as they are not relevant for the purposes of the implementation of the understanding of the present invention.

Naturally, the principle of the invention remaining the same, the forms of embodiment and details of construction may be varied widely with respect to those described and illustrated purely by way of non-limiting example, without thereby departing from the scope of protection of the present invention as defined by the appended claims.

The invention claimed is:

1. A method for the automatic recognition of anomalies in anatomical structures, comprising the steps of:
   acquisition (10) of a plurality of two-dimensional images of at least a portion of a patient's body, which are suitable for forming a three-dimensional representation of at least one anatomical structure under observation,
   segmentation (20) of an internal surface of the colon tissue of the three-dimensional representation, potentially bearing the anomalies,
   selection (30, 40) of the volume image elements (voxels) of the segmented region that are candidates for belonging to anomalies of the anatomical structure represented, on the basis of predetermined morphological parameters, and
   classification (70) of the voxels as elements suspected of belonging to anomalies or elements not belonging to anomalies,
   wherein the segmentation (20) takes place by progressive growth of the internal surface of the colon tissue by aggregation of voxels in accordance with X-radiation absorption intensity values relating to the image elements, starting with seed voxels situated within the internal surface of the colon tissue,
   the process being characterized in that the step of segmentation of the internal surface of the colon tissue includes the step of segmentation of the colon cavity, said segmentation of the colon cavity comprising the steps of:
      calculating the distribution of X-ray absorption intensities of the (residual) voxels,
      performing a three-dimensional region growth starting from seed voxels belonging to the residual image which have an intensity value within the range between a minimum initialization threshold ($T_0$) and a maximum initialization threshold ($T_s$), recognizing as voxels of the colon cavity those voxels the intensity of which is within a range between a minimum global growth threshold ($T_0$) and a maximum global growth threshold ($T_c$), and stopping the process when boundary voxels having intensities that are excluded from the said range are reached,
   wherein, upon the reaching of the boundary voxels, a maximum local fine growth threshold ($T_a$) is calculated for each boundary voxel on the basis of the intensity of the voxels belonging to a predefined area surrounding each boundary voxel,
      defining, for each boundary voxel, a voxel scanning path having a predetermined length and extending from the relative boundary voxel in the direction from which that voxel was reached,
      identifying the maximum intensity value ($M_R$) of the voxels that are present along the scanning path,
      defining the maximum local fine growth threshold ($T_a$) by increasing the maximum global growth threshold ($T_c$) by a predetermined fraction (q) of the difference between the maximum intensity value ($M_R$) identified along the path and the maximum global growth threshold ($T_c$), and
      recognizing the first voxel having an intensity value above the local growth threshold ($T_a$) as a colon tissue surface voxel, if the maximum intensity value ($M_R$) identified along the path is greater than a predetermined comparison intensity value ($T_w$).

2. A method according to claim 1, in which the minimum initialization threshold ($T_0$) corresponds to the lowest possible intensity value and the maximum initialization threshold ($T_s$) corresponds to the difference between the mean and the standard deviation of the distribution included between the minimum initialization threshold ($T_0$) and the intensity value which corresponds to the absorption peak attributable to the lung region ($T_l$).

3. A method according to claim 1, in which the minimum global growth threshold ($T_0$) corresponds to the lowest possible intensity value and the maximum global growth threshold ($T_c$) corresponds to the sum of the mean and of twice the standard deviation of the distribution included between the minimum global growth threshold ($T_0$) and the intensity value which corresponds to the absorption peak attributable to the lung region ($T_l$).

4. A method according to claim 1, in which, if the maximum intensity value ($M_R$) identified along the path is less than the comparison intensity value ($T_w$), it is assumed that the path does not intersect the colon wall and the voxels reached are recognized as belonging to the colon cavity.

5. A method according to claim 1, in which the comparison intensity value ($T_w$) corresponds to the sum of the mean and twice the standard deviation included between the minimum global growth threshold ($T_0$) and the intensity value which corresponds to the absorption peak attributable to the lung region ($T_l$).

6. A method according to claim 1, in which the maximum intensity value ($M_R$) of the voxels present along the scanning path is limited to an upper limit value equal to the intensity value which corresponds to the absorption peak attributable to the muscle area ($T_m$).

7. A method according to claim 1, in which the segmentation process is preceded by a step of recognition of laterally "open" colon cavity regions, including the selection of surface voxels of the entire three-dimensional representation, the identification of air regions adjacent the surface by growth of regions limited to the surface of the entire three-dimensional representation, and the recognition of voxels belonging to "open" colon cavity regions when the air regions identified have a longitudinal extent below a predetermined threshold.

8. A method according to claim 1 comprising, after the selection (40) of the voxels of the segmented region that are candidates for belonging to anomalies in the anatomical structure represented, the steps of:
   growth (50) of regions in the area surrounding the selected voxels, and
   agglomeration (60) of regions of voxels into analysis units in accordance with a predetermined proximity criterion.

9. A method according to claim 8, in which the analysis units are extended from the colon surface to the adjacent tissue by adding tissue voxels selected from the tissue voxels through which rectilinear segments joining the surface voxels identified in the agglomeration step extend.

10. A processing system (100-160) for the automatic recognition of anomalies in anatomical structures that is arranged to implement a process according to claim 1.

11. A non-transitory computer readable medium comprising a processing program or set of programs which are executed by a processing system (100-160) and which comprise one or more code modules for the implementation of a process for the automatic recognition of anomalies in anatomical structures according to claim 1.

* * * * *